(12) United States Patent
You et al.

(10) Patent No.: US 7,904,736 B2
(45) Date of Patent: Mar. 8, 2011

(54) MULTI-THREAD POWER-GATING CONTROL DESIGN

(75) Inventors: Yi-Ping You, Taichung County (TW); Jeng Kuen Lee, Tainan (TW); Kuo Yu Chuang, Yilan County (TW); Chung-Hsien Wu, Taipei (TW)

(73) Assignees: Industrial Technology Research Institute, Hsinchu (TW); National Tsing Hua Universitiy, Hsinchu (TW)

( * ) Notice: Subject to any disclaimer, the term of this patent is extended or adjusted under 35 U.S.C. 154(b) by 746 days.

(21) Appl. No.: 11/961,487

(22) Filed: Dec. 20, 2007

(65) Prior Publication Data

US 2008/0256376 A1  Oct. 16, 2008

(30) Foreign Application Priority Data

Apr. 13, 2007  (TW) .............................. 96112996 A

(51) Int. Cl.
*G06F 1/00* (2006.01)
(52) U.S. Cl. ...................................................... 713/300
(58) Field of Classification Search .................. 713/300
See application file for complete search history.

(56) References Cited

U.S. PATENT DOCUMENTS

| 6,035,376 | A | * | 3/2000 | James | 711/145 |
| 7,111,182 | B2 | * | 9/2006 | Gary | 713/324 |
| 7,380,039 | B2 | * | 5/2008 | Miloushev et al. | 710/244 |
| 2003/0204560 | A1 | * | 10/2003 | Chen et al. | 709/203 |
| 2003/0226046 | A1 | * | 12/2003 | John | 713/300 |
| 2007/0061808 | A1 | * | 3/2007 | Kumar et al. | 718/102 |
| 2009/0007120 | A1 | * | 1/2009 | Fenger et al. | 718/102 |

FOREIGN PATENT DOCUMENTS

TW           519599     2/2003
TW         200725391    7/2007

* cited by examiner

*Primary Examiner* — Thomas Lee
*Assistant Examiner* — Mohammed H Rehman

(57) ABSTRACT

The invention relates to a multi-thread power gating control design, setting idle components into a sleep mode to reduce power consumption due to current leakage. Based on compiler techniques, the invention arranges predicted-power-gating instructions into every thread of a may-happen-in-parallel region. A predicted-power-on instruction determines whether the corresponding component has been powered on, and powers on the component when it has not been powered on yet. A predicted-power-off instruction determines whether the component is required in the rest of the may-happen-in-parallel region, and powers off the component when it is required later.

25 Claims, 10 Drawing Sheets

MULTI-THREAD POWER-GATING CONTROL DESIGN

BACKGROUND OF THE INVENTION

1. Field of the Invention

The invention relates to power-gating control techniques and particularly to power-gating control methods and systems applied to multi-thread programs.

2. Description of the Related Art

Power dissipation of electronic components comprises: static power dissipation and dynamic power dissipation. Static power dissipation is caused by Complementary Metal-Oxide-Semiconductor (CMOS) current leakage. Dynamic power dissipation is generated by switching transient current and charging/discharging current of load capacitors. With continued development of semiconductor processing technology, the size of transistors has reduced, the total number of functional units has increased, and static power dissipation has become more of a problem. As such, it is an important issue to reduce static power dissipation.

A common technique used to solve static power dissipation from occurring is power-gating control design, which controls the power of idle components by power-gating control instructions. The static power dissipation caused by current leakage of idle components can be dramatically reduced by the power-gating control design. The prior art of the invention comprises Taiwan patent publication No. 172459 and Taiwan patent application No. 94147221. The Taiwan publication No. 172459 discloses techniques comprising, obtaining information on the utilization of the components by data flow analysis and arranging power-off instructions prior to the idle regions of the components and power-on instructions after the idle regions of the components. By setting the idle components to a sleep mode, current leakage is reduced. To deal with cases having too much components, Taiwan application No. 94147221 discloses techniques comprising, determining whether the power-gating control instructions are mergeable by data flow analysis and arranging merged power-gating control instructions in proper places to replace the original power-gating control instructions. The merged power-gating control instructions with proper design save more power than the original power-gating control instructions.

The above mentioned techniques are applied to programs with single thread, but cannot be applied to multi-thread programs.

For example, "A conservative data flow algorithm for detecting all pairs of statements that may happen in parallel for rendezvous-based concurrent programs," G. Naumovich and G. S. Avrunin disclosed in Proceedings of the $6^{th}$ ACM SIGSOFT Symposium on the Foundations of Software Engineering, discloses that a may-happen-in-parallel region of a multi-thread program comprises a plurality of threads. The threads are executed in uncertain order so that the idle region of the component is uncertain. The techniques disclosed by Taiwan publication No. 172459 and Taiwan patent application No. 94147221, therefore, cannot be applied to multi-thread programs. Thus, power-gating control techniques for multi-thread programs are called for.

BRIEF SUMMARY OF THE INVENTION

The invention discloses power-gating control methods and power-gating control mechanism for multi-thread programs.

In one embodiment of the invention, a power-gating control method comprises obtaining information on the utilization of a component in a plurality of threads of a may-happen-in-parallel region, arranging a predicated-power-on instruction in each thread prior to the utilization of the component, and arranging a predicated-power-off instruction in each thread after the utilization of the component. The predicated-power-on instruction determines the power state of the component and powers on the component that has not been powered on yet. The predicated-power-off instruction determines whether the component is required later in the may-happen-in-parallel region. When the component is not required later in the may-happen-in-parallel region, the predicated-power-off instruction sets the component to a sleep mode.

In another embodiment of the invention, the power-gating control method comprises obtaining information on the utilization of a plurality of components in a plurality of threads of a may-happen-in-parallel region, arranging a pair of predicated-power-gating instructions for each component in each thread. In each thread, the predicated-power-on instruction is arranged prior to the utilization of the corresponding component, and the predicated-power-off instruction is arranged after the utilization of the corresponding component. The method further comprises determining whether the predicated-power-gating control instructions (including the predicated-power-on instructions and the predicated-power-off instructions) in one thread are mergeable. When the predicated-power-gating control instructions are mergeable, the invention provides a grouped predicated-power-on instruction to replace the predicated-power-on instructions in the thread and provides a grouped predicated-power-off instruction to replace the predicated-power-off instructions in the thread. The grouped predicated-power-on instruction determines the power state of the components, and powers on all the components at the same time when the components have not been powered on yet. The grouped predicated-power-off instruction determines whether the components are required later in the may-happen-in-parallel region. When the components are not required later in the may-happen-in-parallel region, the grouped predicated-power-off instruction powers off the all components at the same time.

The invention further provides a power-gating control mechanism comprising a component comprising a power switch, a compiler, a power-gating controller, a power-gating control register, a switch, and a predicated register. The power-gating control register is controlled by the power-gating controller, and the state of a power switch is dependent on the value of the power-gating control register. The switch is coupled between the power-gating controller and the power-gating control register, and is activated/deactivated according to the state of the predicated register. The initial state of the predicated register is a power-gating controllable state which activates the switch. The predicated register deactivates the switch when in a power-gating non-controllable state.

In such a case, the compiler obtains information on the utilization of the component in a plurality of threads of a may-happen-in-parallel region, arranges a predicated-power-on instruction in each thread prior to the utilization of the component, and arranges a predicated-power-off instruction in each thread after the utilization of the component. When executing the predicated-power-on instruction, the power-gating controller determines the state of the predicated register. When the predicated register is in the power-gating controllable state, the switch is activated, and the power-gating controller sets the power-gating control register to a power-on state to activate the power switch and sets the predicated register to a power-gating non-controllable state. When executing the predicated-power-off instruction, the power-gating controller determines whether the component is still required later in the may-happen-in-parallel region. When the component is not required later in the may-happen-in-parallel region, the power-gating controller sets the predicated register to the power-gating controllable state to activate the switch, and sets the power-gating control register to a power-off state to deactivate the power switch.

In another embodiment of the invention, a power-gating control mechanism comprises a plurality of components each comprising a power switch, a compiler, a power-gating controller, a power-gating control register, and a predicated register. The power-gating control register is controlled by the power-gating controller. The states of all the power switches are dependent on the value of the power-gating control register. The switch is coupled between the power-gating controller and the power-gating control register, and is activated/deactivated according to the state of the predicated register. The initial state of the predicated register is a power-gating controllable state which activates the switch. When the predicated register is in a power-gating non-controllable state, the switch is deactivated.

In such a case, the compiler obtains information on the utilization of the components in a plurality of threads of a may-happen-in-parallel region, arranges a predicated-power-on instruction for each component in each thread, and arranges a predicated-power-off instruction for each component in each thread. In each thread, the predicated-power-on instruction is arranged prior to the utilization of the corresponding component, and the predicated-power-off instruction is arranged after the utilization of the corresponding component. The compiler determines whether the predicated-power-gating control instructions in one thread are mergeable. When they are mergeable, the compiler provides a grouped predicated-power-on instruction to replace the predicated-power-on instructions in the thread and provides a grouped predicated-power-off instruction to replace the predicated-power-off instructions in the thread. When executing the grouped predicated-power-on instruction, the power-gating controller determines the state of the predicated register. When the predicated register is in the power-gating controllable state that activates the switch, the power-gating controller sets the power-gating control register to a power-on state to turn on the power switches of all components. The power-gating controller then sets the predicted register to a power-gating non-controllable state to indicate that the components are active. When executing the grouped predicated-power-off instruction, the power-gating controller determines whether the components are still required later in the may-happen-in-parallel region. When the components are not required later in the may-happen-in-parallel region, the power-gating controller sets the predicated register to the power-gating controllable state to activate the switch and sets the power-gating control register to a power-off state that deactivates all power switches. All components are switched to a sleep mode at the same time.

The above and other advantages will become more apparent with reference to the following descriptions taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The invention is applied to multi-thread programs. The invention analyzes the program by compiler techniques and arranges predicated-power-on instructions and predicated-power-off instructions in a plurality of threads of a may-happen-in-parallel region. The processor sets idle component into a sleep mode by executing the predicated-power-gating control instructions (including the predicated-power-on instructions and the predicated-power-off instructions). The predicated-power-gating control instructions avoid repeatedly powering on the component or untimely powering off of the component. The invention lowers current leakage when executing multi-thread programs and reduces static power dissipation.

Figure 1:
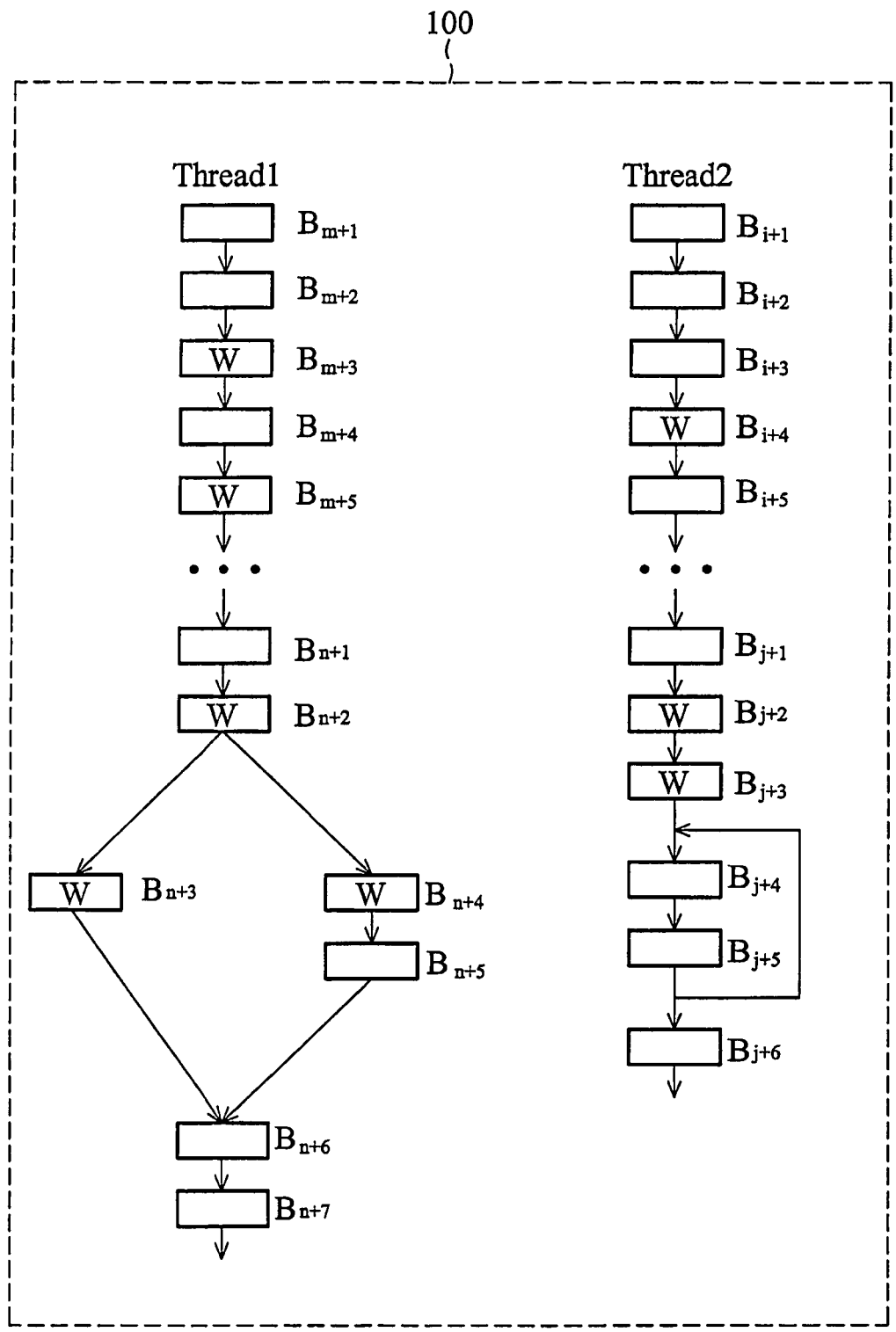
FIG. 1 shows a control flow graph for a may-happen-in-parallel region comprising two threads of a multi-thread program.

FIG. 1 shows a control flow graph for a may-happen-in-parallel region 100 of a multi-thread program. For simplicity, the example only comprises one single power-gating controllable component. The component may be an operational unit of a computer system, such as an integer multiplexer, a floating point adder, a floating point multiplexer, or a floating point divider, etc., or a peripheral device of a processor, such as a graphics accelerator, a SSL accelerator, or etc. Referring to FIG. 1, the may-happen-in-parallel region 100 comprises two threads, Thread1 and Thread2, respectively. Thread1 comprises two branches after $B_{n+2}$. Thread2 comprises a loop between $B_{j+3}$ and $B_{j+6}$. The loop repeats at least three times. Label 'W' indicates that the component is working. As shown in FIG. 1, the component works at $B_{m+3}$, $B_{m+5}$, $B_{n+2}$, $B_{n+3}$, and $B_{n+4}$ in Thread1 and $B_{i+4}$, $B_{j+2}$, and $B_{j+3}$ in Thread2.

The processor executes threads concurrently in the may-happen-in-parallel region 100. For instance, the processor may execute some jobs of Thread1 first, and then all jobs of Thread2, and finally the rest jobs of Thread1. Because the executing sequence of threads is unpredictable, the power-gating control technique disclosed in Taiwan Patent Publication No. 172348 is improper.

Figure 2:
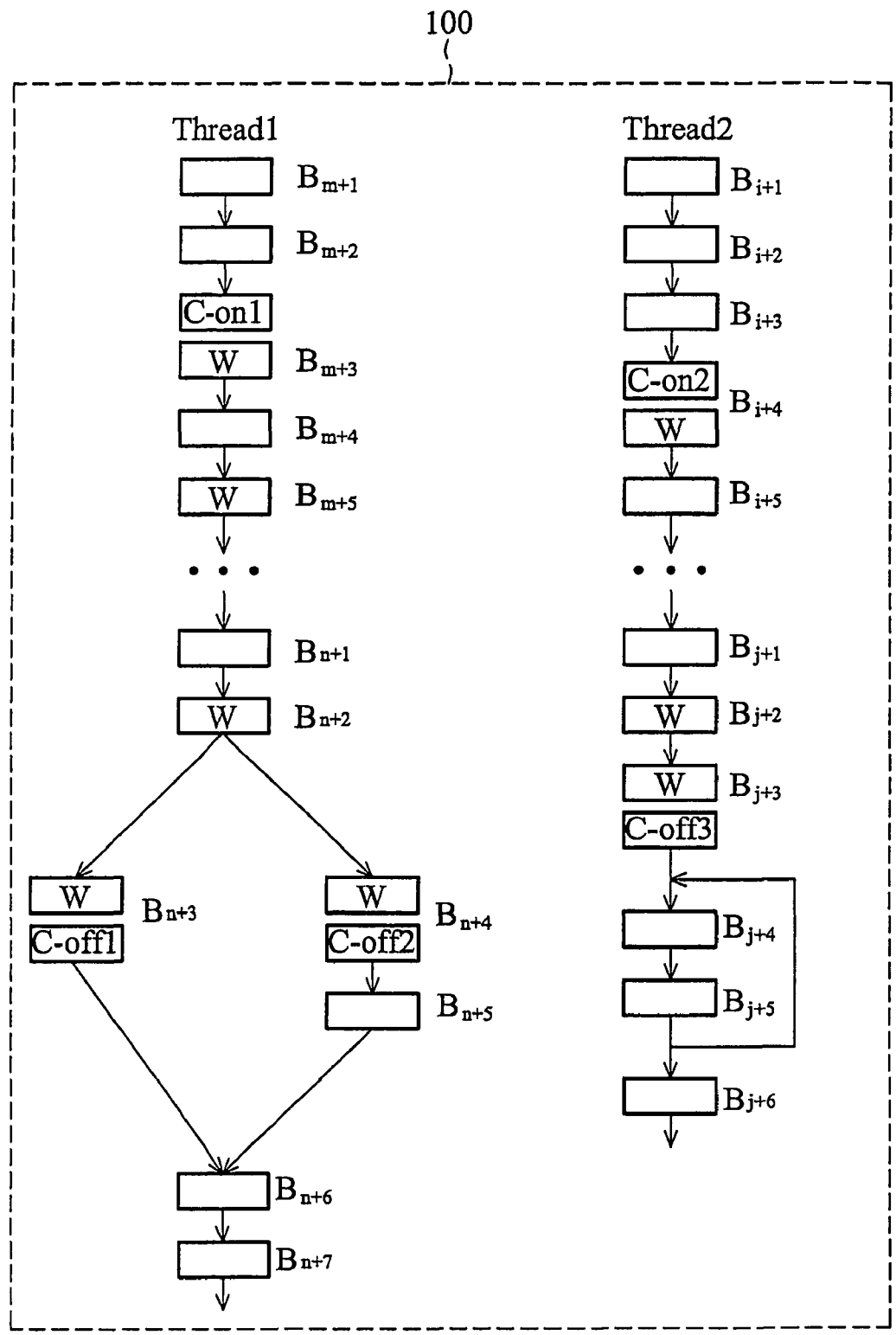
FIG. 2 shows how the power-gating control method of the invention is applied to the threads shown in FIG. 1.

The invention provides power-gating control methods for multi-thread programs. Based on the utilization status of the component in a plurality of threads of a may-happen-in-parallel region, the invention arranges a predicated-power-on instruction in each thread prior to the utilization of the component and arranges a predicated-power-off instruction in each thread after the utilization of the component. FIG. 2 shows how the power-gating control method of the invention is applied to the threads shown in FIG. 1. Referring to FIGS. 1 and 2, Thread1 starts using the component at $B_{m+3}$ and stops using the component after $B_{m+3}$ or $B_{m+4}$, Thread2 starts using the component at $B_{i+4}$ and stops using the component after $B_{j+3}$. In Thread1, the invention arranges a predicated-power-on instruction C-on1 prior to $B_{m+3}$, a predicated-power-off instruction C-off1 after $B_{m+3}$, and a predicated-power-off instruction C-off2 after $B_{n+4}$. In Thread2, the invention arranges a predicated-power-on instruction C-on2 prior to $B_{i+4}$ and a predicated-power-off instruction C-off3 right after $B_{j+3}$.

The predicated-power-on instruction (C-on1 or C-on2) determines the power state of the component. When the component has not been powered on yet, the predicated-power-on instruction (C-on1 or C-on2) powers on the component. The predicated-power-off instruction (C-off1, C-off2, or C-off3) determines whether the component is required later in the may-happen-in-parallel region 100. When the utilization of the component has finished in the region 100, the predicated-power-off instruction (C-off1, C-off2, or C-off3) sets the component to a sleep mode. The predicated-power-on instructions (C-on1 and C-on2) avoid powering on the component repeatedly. The predicated-power-off instructions (C-off1, C-off2, and C-off3) avoid powering off the component while the component is required later in the may-happen-in-parallel region 100.

In another embodiment of the invention, the invention further provides a predicated register and a citing counter. The initial state of the predicated register is a power-gating controllable state, and the initial value of the citing counter is zero. When executing the predicated-power-on instruction, the invention determines the state of the predicated register, powers on the component and sets the predicated register to a power-gating non-controllable state when the predicated register is in the power-gating controllable state, and adds one to the citing counter. When executing the predicated-power-off instruction, the invention subtracts one from the citing counter and then determines the value of the citing counter. Once the citing counter is zero, the invention sets the predicated register to the power-gating controllable state. After setting the predicated register to the power-gating controllable state, the invention sets the component to the sleep mode.

Referring to FIG. 2, in one example, Thread1 and Thread2 of the may-happen-in-parallel region 100 are executed according to the following order: ($B_{m+1} \sim B_{m+3}$), ($B_{i+1} \sim B_{j+6}$) and then ($B_{m+4} \sim B_{n+7}$), wherein the program chooses the branch comprising $B_{n+3}$. The predicated-power-on instruction C-on1 is the first predicated-power-gating instructions executed in the may-happen-in-parallel region 100. Before executing the predicated-power-on instruction C-on1, the predicated register is in its initial state-power-gating controllable state, indicating that the component has not been powered on yet. The predicated-power-on instruction C-on1, therefore, powers on the component and then sets the predicated register to a power-gating non-controllable state indicating that the component has been powered on, and adds one to the citing counter (initially zero). With the value of the citing counter now 1, the value indicates that there is one executing thread still requiring the component later. The predicated-power-on instruction C-on2 is the next predicated-power-gating instruction executed in the may-happen-in-parallel region 100. Because the predicated register is in the power-gating non-controllable state indicating that the component has been powered on previously, the predicated-power-on instruction C-on2 only adds one to the citing counter without powering on the component. With the value of the citing counter now 2 (1+1=2), the value indicates that there are two executing threads still requiring the component later. The next predicated-power-gating instruction is the predicated-power-off instruction C-off3. The predicated-power-off instruction C-off3 subtracts one from the citing counter. With the value of the citing counter now 1 (2−1=1) again, the value indicates that there is one executing thread still requiring the component later so that the predicated-power-off instruction C-off3 doesn't change the power state of the component. The predicated-power-off instruction C-off1 is the next predicated-power-gating instruction, which subtracts one from the citing counter. With the value of the citing counter now 0 (1−1=0) again, the value indicates that there is no executing thread still requiring the component later so that the predicated-power-off instruction C-off1 sets the predicated register to the power-gating controllable state and then sets the component to the sleep mode.

However, in some cases, the above mentioned method may waste more energy. In a case where Thread2 is executed after completely executing Thread1, the first predicated-power-gating instruction is the predicated-power-on instruction C-on1. Before executing C-on1, the predicated register is in its initial state-power-gating controllable state, which indicates that the component has not been powered on yet. The predicated-power-on instruction C-on1 powers on the component, sets the predicated register to a power-gating non-controllable state to indicate that the component has been powered on, and adds one to the citing counter. The value of the citing counter is 1 (0+1=1), which indicates that there is one executing thread still requiring the component later in the may-happen-in-parallel region 100. Assuming that the program chooses the branch comprising $B_{n+3}$, the predicated-power-off instruction C-off1 is the next predicated-power-gating instruction. The predicated-power-off instruction C-off1 subtracts 1 from the citing counter. Because the value of the citing counter is now 0 (1−1=0), the value indicates that Thread1 finished the utilization of the component, and the predicated-power-off instruction C-off1 sets the predicated register to the power-gating controllable state and then sets the component to the sleep mode. The next predicated-power-gating instruction is the predicated-power-on instruction C-on2. Because the predicated register is in the power-gating controllable state (representing that the component is inactive), the predicated-power-on instruction C-on2 powers on the component, sets the predicated register to the power-gating non-controllable state indicating that the component has been powered on, and adds one to the citing counter. The value of the citing counter is now 1 (0+1=1), indicating that Thread2 still requires the component later. The next predicated-power-gating instruction is the predicated-power-off instruction C-off3. C-off3 subtracts one from the citing counter. Because the value of the citing counter is 0 (1−1=0) now, the value indicates that Thread2 finished the utilization of the component so that the predicated-power-off instruction C-off3 sets the predicated register to the power-gating controllable state and then sets the component to the sleep mode.

In this case, the component is powered on and off in Thread1 and then powered on and off in Thread2. The repetition of powering on and off the component in one mayhappen-in-parallel region may waste more power than that without using the power-gating control method. To reduce power dissipation generated by repeatedly powering on and off the component, the invention further provides a thread counter having an initial value equal to the total amount of the threads in the may-happen-in-parallel region. When executing the predicated-power-on instruction, the invention determines the state of the predicated register, powers on the component and sets the predicated register to the power-gating non-controllable state when the predicated register is in the power-gating controllable state, adds one to the citing counter, and subtracts one from the thread counter. When executing the predicated-power-off instruction, the invention subtracts one from the citing counter and determines the value of the citing counter and the thread counter. When both the citing counter and the thread counter are zero, the predicated-power-off instruction sets the predicated register to the power-gating controllable state and then sets the component to the sleep mode.

When the invention comprising the thread counter is applied to the above mentioned example (completely executing Thread1 and then completely executing Thread2), the unnecessary powering on and off is canceled. Referring to FIG. 2, the first predicated-power-gating instruction is the predicated-power-on instruction C-on1. Before executing the predicated-power-on instruction C-on1, the predicated register is in its initial state-power-gating controllable state, indicating that the component has not been powered on yet. The predicated-power-on instruction C-on1, therefore, powers on the component and then sets the predicated register to the power-gating non-controllable state to indicate that the component has been powered on. In addition, the predicated-power-on instruction C-on1 adds one to the citing counter and subtracts one from the thread counter (having an initial value of 2). The vale of the citing counter is 1 (0+1=1), indicating that Thread1 requires the component later. The value of the thread counter is 1 (2−1=1), indicating that the total amount of the unexecuted threads is one. Assuming that the program chooses the branch comprising $B_{n+3}$, the next predicated-power-gating control instruction is the predicated-power-off instruction C-off1. C-off1 subtracts one from the citing counter. The value of the citing counter is now 1 (1−0=0), indicating that Thread1 finished the utilization of the component. Although the value of the citing counter is zero, the predicated-power-off instruction C-off1 does not change the power state of the component because the value of the thread counter is not zero (indicating that there are some threads left unexecuted in the may-happen-in-parallel region 100 and may require the component later). The next predicated-power-gating instruction is the predicated-power-on instruction C-on2. Because the predicated register is in the power-gating non-controllable state (indicating that the component has been powered on previously), the predicated-power-on instruction C-on2 does not have to power on the component. The predicated-power-on instruction C-on2 adds one to the citing counter and subtracts one from the thread counter. The value of the citing counter is now 1 (0+1=1), indicating that Thread2 requires the component later. The value of the thread counter is now 0 (1−0=0), indicating that no thread are left unexecuted in the may-happen-in-parallel region 100. The next predicated-power-gating instruction is the predicated-power-off instruction C-off3. C-off3 subtracts one from the citing counter. The value of the citing counter is now 0 (1−1=0), indicating that no executing thread requires the component later. Because both the citing counter and the thread counter are zero (indicating that all threads of the may-happen-in-parallel region 100 finished the utilization of the component), the predicated-power-off instruction C-off3 sets the component to the sleep mode.

The above mentioned power-gating control methods, however, may not reduce the power dissipation in some multi-thread programs. The conventional power-gating control methods—arranging a power-on instruction at the start of the may-happen-in-parallel region and arranging a power-off instruction at the end of the may-happen-in-parallel region—may reduce more power dissipation than the power-gating control methods of the invention. The invention further discloses a decision-making rule determining whether the power-gating control methods of the invention save more power than the conventional power-gating control method. After confirming that the power-gating control methods of the invention save more power than the conventional one, the power-gating control methods of the invention are adopted.

In one embodiment, the decision-making rule is the following inequality:

$$\overline{M}(C) + \underline{M}(C) > K \times \frac{E_{pseudo\_on}(C) + E_{pseudo\_off}(C)}{P_{leak}(C) - P_{rleak}(C)}.$$

When the inequality is satisfied, the power-gating control method of the invention saves more power than the conventional one. C represents the component. $\overline{M}(C) = \min_{\forall i} \overline{\delta}S(i,C)$ and $\underline{M}(C) = \min_{\forall i} \underline{\delta}(i,C)$, wherein i represents the thread number, $\overline{\delta}(i,C)$ represents the time difference between the start of the ith thread and the time point the ith thread starts to use the component C, and $\underline{\delta}(i,C)$ represents the time difference between the time point the ith thread finishes the use of the component C and the end of the ith thread. $P_{leak}(C)$ represents the power consumption due to current leakage when the component C is active. $P_{rleak}(C)$ represents the power consumption due to current leakage when the component C is inactive. K indicates the total amount of the threads. $E_{pseudo\_on}(C)$ represents energy dissipation while executing the predicated-power-on instruction without powering on the component C. $E_{pseudo\_off}(C)$ represents energy dissipation while executing the predicated-power-off instruction without powering off the component C.

Referring to FIG. 1, C represents the component being power-gating controlled. Thread1 and Thread2 are numbered '1' and '2', respectively. The total amount of the threads is 2, that means K=2. $\overline{\delta}(1,C)=2$ and $\overline{\delta}(2,C)=3$ so that $\overline{M}(C)=\min(2,3)=2$. $\underline{\delta}(1,C)$ may be 2 when the program chooses the branch comprising $B_{n+3}$ or 3 when the program chooses the branch comprising $B_{n+4}$ and $B_{n+5}$. $\underline{\delta}(2,C)=2\times3+1=7$ since the loop of Thread2 repeats at least three times. Therefore, $\underline{M}(C)=\min(2,3,7)=2$. The summation of $\overline{M}(C)$ and $\underline{M}(C)$ is 4.

In one embodiment, both $E_{pseudo\_on}(C)$ and $E_{pseudo\_off}(C)$ are 5, $P_{leak}(C)$ is 7, and $P_{rleak}(C)$ is zero.

$$K \times \frac{E_{pseudo\_on}(C) + E_{pseudo\_off}(C)}{P_{leak}(C) - P_{rleak}(C)} = 2 \times \frac{5+5}{7-0} = \frac{20}{7},$$

which is smaller than the value of $\overline{M}(C)+\underline{M}(C)$. In the case, the power-gating control methods of the invention save more power than the conventional one.

In addition to directly powering off the component, multi-threshold voltage control or any hardware control techniques can all be applied to reduce the power dissipation when the power-gating control methods of the invention suggest setting the component to the sleep mode.

Although the above mentioned embodiments only comprise a single power-gating controllable component, the invention can further be applied to designs comprising a plurality of power-gating controllable components. The design may be a computer system, and the power-gating controllable components may be an integer multiplexer, a floating point adder, a floating point multiplexer, a floating point divider, etc., of the computer system.

The amount of the predicted registers, citing counters, thread counters increases with the increasing amount of the power-gating controllable components. For example, in a system comprising N power-gating controllable components, the above mentioned power-gating control techniques require N citing counters and N thread counters. To reduce the amount of the citing counters and the thread counters, the invention further discloses power-gating controllable methods merging the predicted-power-gating instructions of a signal thread. In such cases, the components share a single predicted register, a single citing counter, and a single thread counter.

Figure 3:
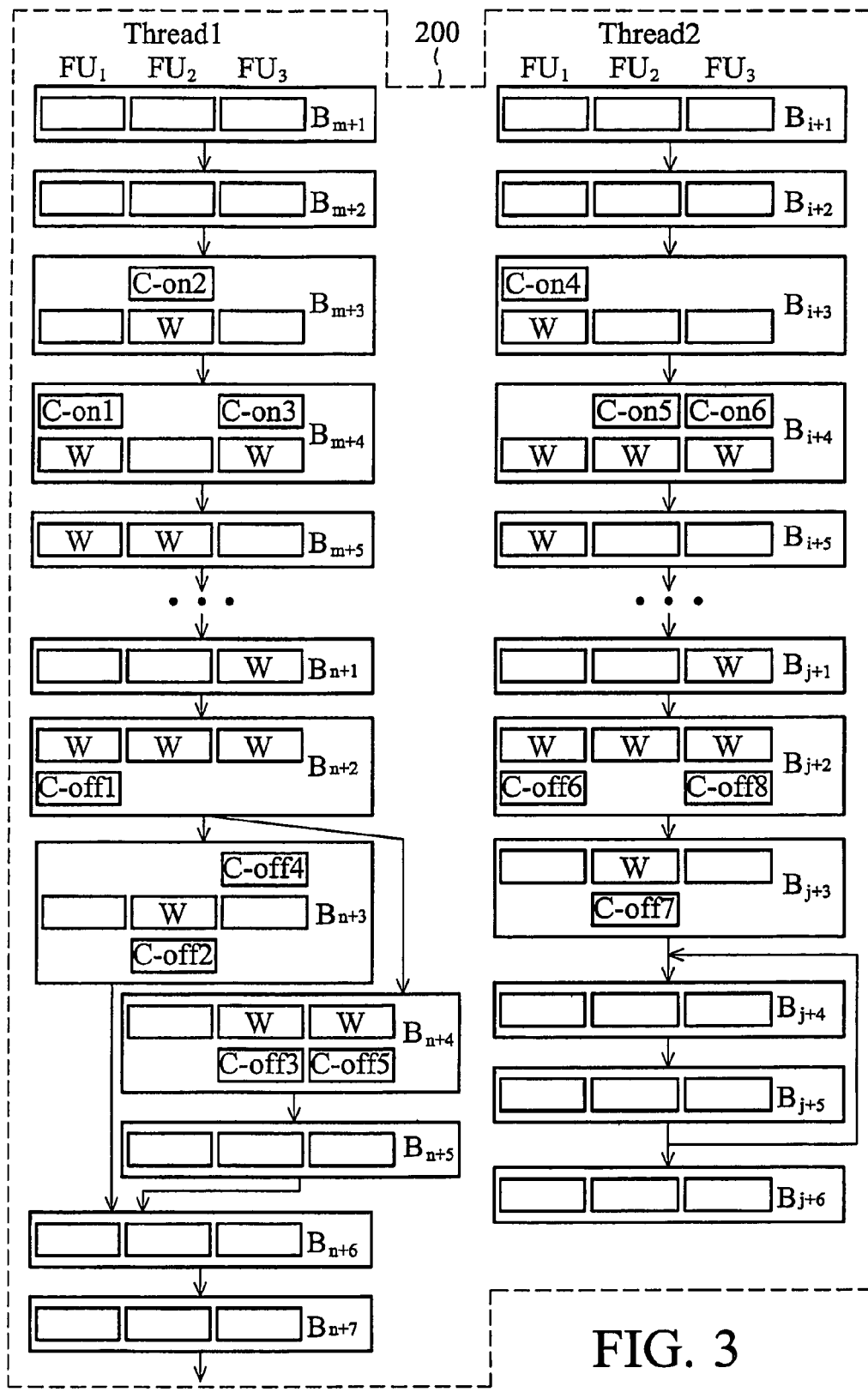
FIG. 3 shows a control flow graph for a may-happen-in-parallel region comprising two threads of a multi-thread program.

In some embodiments, the power-gating control methods obtains information on the utilization statuses of the components in a plurality of threads of a may-happen-in-parallel region, arranges a predicted-power-on instruction in each thread for each component, and arranges a predicted-power-off instruction in each thread for each component. In each thread, each predicted-power-on instruction is arranged prior to the utilization of its corresponding component, and each predicted-power-off instruction is arranged after the utilization of the corresponding component. FIG. 3 shows a control flow graph for a may-happen-in-parallel region 200 comprising two threads of a multi-thread program. Thread2 comprises a loop repeating at least three times. Referring to FIG. 3, the system comprises three power-gating controllable components $FU_1$, $FU_2$, and $FU_3$. After analyzing the utilization of the components $FU_1$, $FU_2$, and $FU_3$, predicted-power-on instructions C-on1~C-on6 and predicted-power-off instructions C-off1~C-off8 are arranged into the program, wherein 'W' indicates that the program requires the component at that time point.

According to the control flow graph comprising the arranged predicted-power-gating instructions (FIG. 3), the invention determines whether the predicted-power-gating instructions for different components in one thread are mergeable. When they are mergeable, the invention provides a merged predicted-power-on instruction to replace the predicted-power-on instructions in the thread and provides a merged predicted-power-off instruction to replace the predicted-power-off instructions in the thread.

Figure 4:
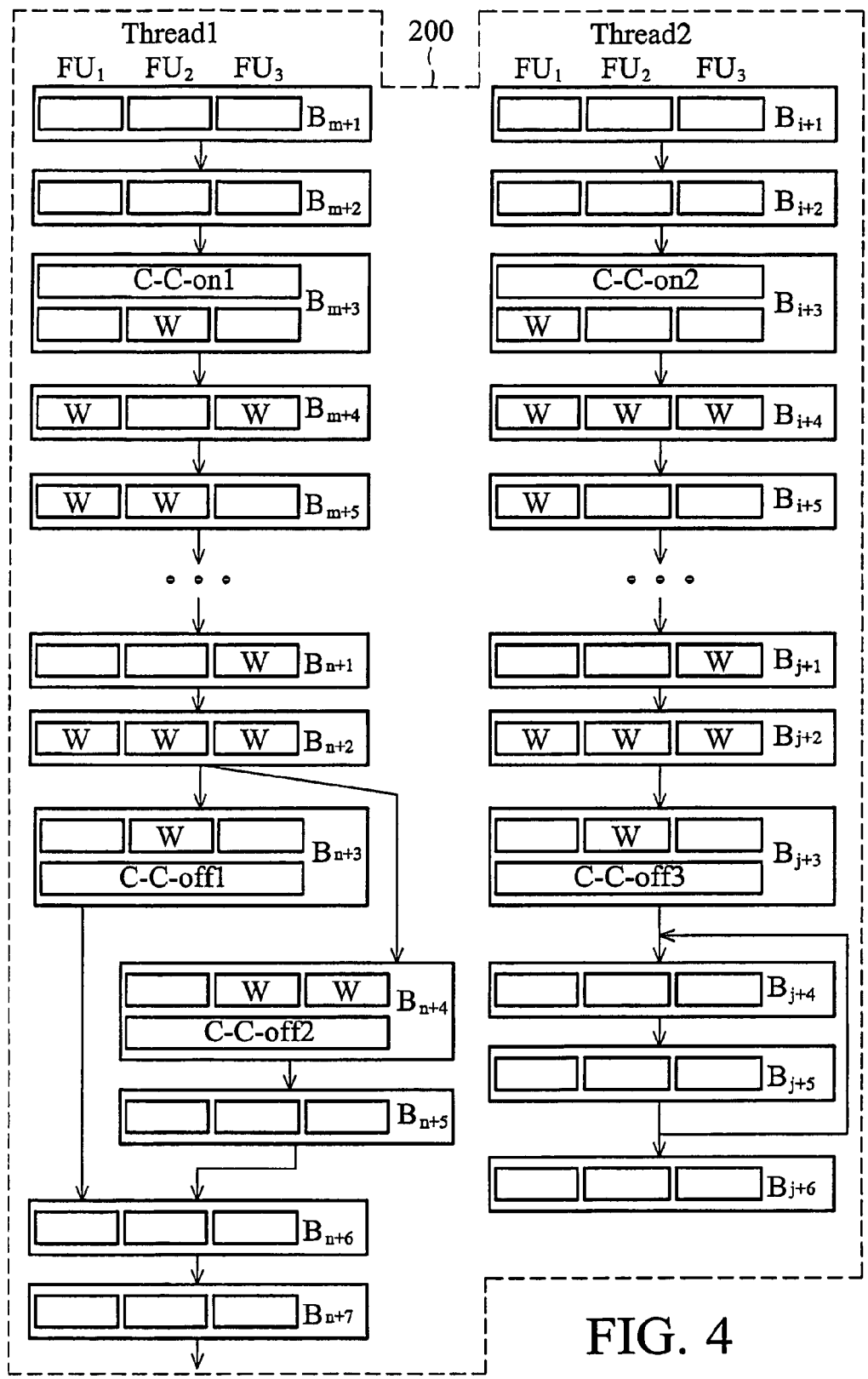
FIG. 4 shows how the power-gating control method of the invention is applied to the threads shown in FIG. 3.

FIG. 4 shows how the grouped predicted-power-gating control instructions replace the predicted-power-gating instructions shown in FIG. 3. Referring to FIG. 4, the component $FU_2$ is the first power-gating controllable component used in Thread1 and its utilization starts at $B_{m+3}$, so that a grouped predicted-power-on instruction is arranged prior to $B_{m+3}$ to replace the predicted-power-on instructions C-on1, C-on2 and C-on3 shown in Thread1 of FIG. 3. The grouped predicted-power-on instruction C-C-on1 determines whether the components $FU_1$, $FU_2$, and $FU_3$ have been powered on. When the components $FU_1$, $FU_2$, and $FU_3$ are still inactive, the grouped predicted-power-on instruction C-C-on1 powers on the components $FU_1$, $FU_2$ and $FU_3$ at the same time. Referring to FIG. 4, component $FU_1$ is the first power-gating controllable component used in Thread2 and its utilization starts at $B_{i+3}$, so that a grouped predicted-power-on instruction C-C-on2 is arranged prior to $B_{i+3}$ to replace the predicted-power-on instructions C-on4, Con5, C-on6 shown in Thread2 of FIG. 3. The predicted-power-on instruction C-C-on2 determines whether the components $FU_1$, $FU_2$, and $FU_3$ have been powered on, and powers on all the components $FU_1$, $FU_2$ and $FU_3$ together when the components $FU_1$, $FU_2$, and $FU_3$ are inactive.

Referring to FIG. 4, when the program chooses the branch comprising $B_{n+3}$, component $FU_2$ is the last power-gating controllable component used in Thread1 and its utilization ends at $B_{n+3}$. The invention arranges a grouped predicted-power-off instruction C-C-off1 after $B_{n+3}$ to replace the predicted-power-off instructions C-off1, C-off2, and C-off4 shown in Thread1 of FIG. 3. The grouped predicted-power-off instruction C-C-off1 determines whether the components $FU_1$, $FU_2$, or $FU_3$ are still required later in the may-happen-in-parallel region 200. When they are not required later, the grouped predicted-power-off instruction C-C-off1 powers off all the components $FU_1$, $FU_2$, and $FU_3$ together. Referring to FIG. 4, when the program chooses the branch comprising $B_{n+4}$ and $B_{n+5}$, components $FU_2$ and $FU_3$ are the last power-gating controllable components used in Thread1 and their utilization end at $B_{n+4}$. The invention arranges a grouped predicted-power-off instruction C-C-off2 after $B_{n+4}$ to replace the predicted-power-off instructions C-off1, C-off3, and C-off5 shown in Thread1 of FIG. 3. The grouped predicted-power-off instruction C-C-off2 determines whether the components $FU_1$, $FU_2$, or $FU_3$ are still required later in the may-happen-in-parallel region 200. When they are not required later, the grouped predicted-power-off instruction C-C-off2 powers off all the components $FU_1$, $FU_2$, and $FU_3$ together. Referring to FIG. 4, component $FU_2$ is the last power-gating controllable component used in Thread2 and its utilization ends at $B_{j+3}$. The invention arranges a grouped predicted-power-off instruction C-C-off3 after $B_{j+3}$ to replace the predicted-power-off instructions C-off6, C-off7 and C-off8 in Thread2 of FIG. 3. The grouped predicted-power-off instruction C-C-off3 determines whether the components $FU_1$, $FU_2$, or $FU_3$ are still required later in the may-happen-in-parallel region 200. When they are not required later, the grouped predicted-power-off instruction C-C-off3 powers off all the components $FU_1$, $FU_2$, and $FU_3$ together.

In some embodiments, the invention further provides a predicted register and a citing counter. The initial state of the predicted register is a power-gating controllable state, and the initial value of the citing counter is zero. Referring to FIG. 4, in a case that the thread of the may-happen-in-parallel region 200 are executed by the following order: portion of Thread1 ($B_{m+1}$~$B_{m+3}$), the complete Thread2 ($B_{i+1}$~$B_{j+6}$), and rest of Thread1 ($B_{m+4}$~$B_{n+7}$), the first power-gating control instruction is the grouped predicted-power-on instruction C-C-on1. C-C-on1 determines the state of the predicted register. Because the predicted register is in its initial state—the power-gating controllable state, indicating that all components $FU_1$, $FU_2$ and $FU_3$ have not been powered on yet, C-C-on1 powers on all the components $FU_1$, $FU_2$, and $FU_3$ together and then sets the predicted register to a power-gating non-controllable state to indicate that the components $FU_1$, $FU_2$, and $FU_3$ have been powered on. The grouped predicted-power-on instruction C-C-on1 further adds one to the citing counter, irrelevant of the predicted register state, to record the amount of executing threads requiring any of the components $FU_1$, $FU_2$, and $FU_3$ later in the may-happen-in-parallel region 200. The value of the citing counter, therefore, is now 1 (0+1=1). The next power-gating control instruction is the grouped predicted-power-on instruction C-C-on2. Because the predicted register is in the power-gating non-controllable state indicating that the components $FU_1$, $FU_2$, and $FU_3$ have been powered on previously, C-C-on2 does nothing to the power state of the components $FU_1$, $FU_2$, and $FU_3$ to avoid repeating the power-on action. The grouped predicted-power-on instruction C-C-on2 only adds one to the citing counter, and the value of the citing counter is now 2 (1+1=2), indicating that both Thread1 and Thread2 require any of the components $FU_1$, $FU_2$, and $FU_3$ later. The next power-gating control instruction is the grouped predicted-power-off instruction C-C-off3. C-C-off3 subtracts one from the citing counter to indicate that Thread2 does not need the components $FU_1$, $FU_2$, and $FU_3$ later so that the value of the citing counter is 1 (2−1=1). Because the value of the citing counter is not zero, it means that Thread1 still require any of the components $FU_1$, $FU_2$, and $FU_3$ later, so that the grouped predicted-power-off instruction C-C-off3 does not proceed with the power-off action. Depending on the branch chosen by the program, the next power-gating control instruction may be C-C-off1 or C-C_off2. When the branch comprising $B_{n+3}$ is chosen, the grouped predicted-power-off instruction C-C-off1 is the next power-gating control instruction. C-C-off1 subtracts one from the citing counter. The value of the citing counter is now 0 (1−1=0), indicating that both Thread1 and Thread2 finished the use of the components $FU_1$, $FU_2$, and $FU_3$, so that the grouped predicted-power-off instruction C-C-off1 sets the predicted register to the power-gating controllable state and then sets the components $FU_1$, $FU_2$, and $FU_3$ to the sleep mode to reduce power consumption caused by current leakage.

In some cases, the original arrangement of the predicted-power-gating instructions saves more power than the grouped predicted-power-gating instructions. In some embodiments, the invention further discloses an inequality, $$\sum_{\forall C} [(\overline{M}(C) - \overline{\overline{M}} + \underline{M}(C) - \underline{\underline{M}}) \times (P_{leak}(C) - P_{rleak}(C))] <$$
$$-K \times (E_{pseudo\_on} + E_{pseudo\_off}) + \sum_{\forall C} K_C \times (E_{pseudo\_on}(C) + E_{pseudo\_off}(C)).$$

The grouped predicted-power-gating instructions save more energy when the inequality is satisfied. C represents the component. $\overline{M}(C)=\min_{\forall i}\overline{\delta}(i,C)$ and $\underline{M}(C)=\min_{\forall i}\underline{\delta}(i,C)$, wherein i represents the thread number, $\overline{\delta}(i,C)$ represents the time difference between the start of the ith thread and the time point the ith thread starts to use the component C, and $\underline{\delta}(i,C)$ represents the time difference between the time point the ith thread ends the utilization of the component C and the end of the ith thread. $\overline{\overline{M}}=\min_{\forall C}\overline{M}(C)$ and $\underline{\underline{M}}=\min_{\forall C}\underline{M}(C)$. $P_{leak}(C)$ represents power consumption current leakage when the component C is active. $P_{rleak}(C)$ represents power consumption current leakage while the component C is inactive. K is the total amount of threads in the may-happen-in-parallel region. $E_{pseudo\_on}$ represents energy dissipation of a grouped predicted-power-on instruction that does not execute a power-on action. $E_{pseudo\_off}$ represents energy dissipation of a grouped predicted-power-off instruction that does not execute a power-off action. $K_C$ represents the total amount of threads for the component C. $E_{pseudo\_on}(C)$ represents energy dissipation of the predicted-power-on instruction of the component C, wherein the predicted-power-on instruction does not execute a power-on action on the component C. $E_{pseudo\_off}(C)$ represents energy dissipation of the predicted-power-off instruction of the component C, wherein the predicted-power-off instruction does not execute a power-off action on the component C.

Referring to FIG. 3, Thread1 and Thread2 are numbered '1' and '2', respectively. The total amount of the threads is 2, K=2. $K_{FU1}=K_{FU2}=K_{FU3}=2$. $\overline{\delta}(1,FU_1)=3$ and $\overline{\delta}(2,FU_1)=2$, so that $\overline{M}(FU_1)=\min_{\forall i}\overline{\delta}(i,FU_1)=2$. $\overline{\delta}(1,FU_2)=2$ and $\overline{\delta}(2,FU_2)=3$, so that $\overline{M}(FU_2)=\min_{\forall i}\overline{\delta}(i,FU_2)=2$. $\overline{\delta}(1,FU_3)=3$ and $\overline{\delta}(2,FU_3)=3$, so that $\overline{M}(FU_3)=\min_{\forall i}\overline{\delta}(i,FU_3)=3$. Therefore, $\overline{\overline{M}}=\min(\overline{M}(FU_1),\overline{M}(FU_2),\overline{M}(FU_3))=\min(2,2,3)=2$.

Depending on the branch chosen by the program, $\underline{\delta}(1,FU_1)$ may be 3 (equal to 1+2) or 4 (equal to 2+2), $\underline{\delta}(1,FU_2)$ may be 2 or 3 (equal to 1+2). $\underline{\delta}(1,FU_3)$ may be 3 (equal to 1+2) or 3 (equal to 1+2). Because $\underline{\delta}(2,FU_1)=1+2\times3+1=8$, $\underline{\delta}(2,FU_2)=2\times3+1=7$, and $\underline{\delta}(2,FU_3)=1+2\times3+1=8$, $\underline{M}(FU_1)=\min_{\forall i}\underline{\delta}(i,FU_1)=3$, $\underline{M}(FU_2)=\min_{\forall i}\underline{\delta}(i,FU_2)=2$ and $\underline{M}(FU_3)=\min_{\forall i}\underline{\delta}(i,FU_3)=3$, and $\underline{\underline{M}}=\min(\underline{M}(FU_1),\underline{M}(FU_2),\underline{M}(FU_3))=2$.

The processor further substitutes the values of $P_{leak}(FU_1)\sim P_{leak}(FU_3)$, $P_{rleak}(FU_1)\sim P_{rleak}(FU_3)$, $E_{pseudo\_on}$, $E_{pseudo\_off}$, $E_{pseudo\_on}(FU_1)\sim E_{pseudo\_on}(FU_3)$, and $E_{pseudo\_off}(FU_1)\sim E_{pseudo\_off}(FU_3)$ into the inequality to determine that whether the grouped predicted-power-gating instructions shown in FIG. 4 save more energy than the predicted-power-gating instructions shown in FIG. 3.

Figure 5:
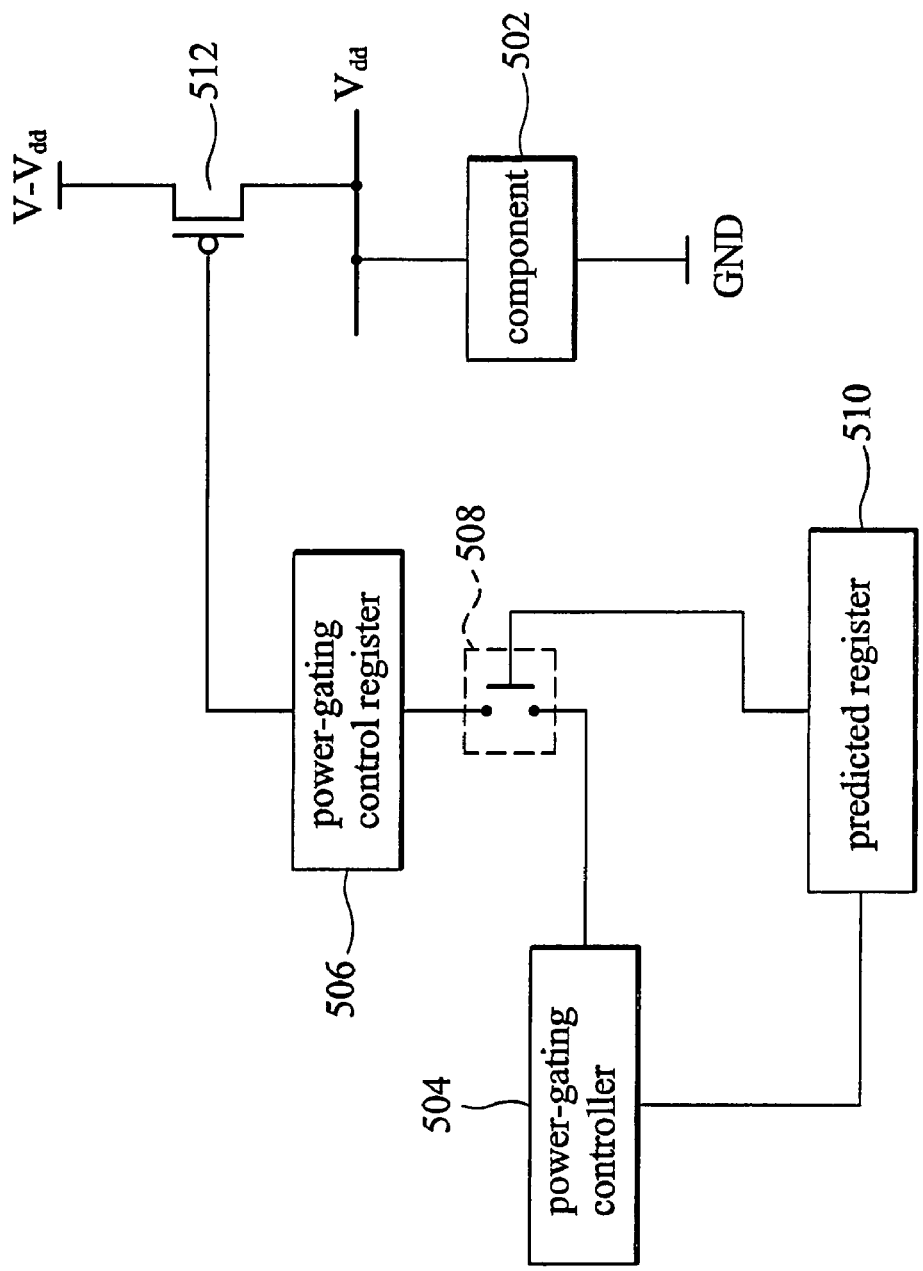
FIG. 5 shows an embodiment of the power-gating control mechanism of the invention that comprises a single power-gating controllable component.

The invention further discloses power-gating control mechanisms realizing the above mentioned power-gating control methods. FIG. 5 shows one embodiment of the system, comprising a component 502, a compiler (not shown), a power-gating controller 504, a power-gating control register 506, a switch 508 and a predicted register 510. The component 502 is controlled by a power switch 512 and is switched between an active mode and an inactive mode. When the power-gating control mechanism is applied to computer systems, the component 502 may be an operation component, such as an integer multiplier, a floating point adder, a floating point multiplier, or a floating point divider, etc., or a peripheral device of a processor. The switch 508 is coupled between the power-gating controller 504 and the power-gating control register 506, and is activated when the predicted register 510 is in a power-gating controllable state. The initial state of the predicted register 510 is power-gating controllable state.

When compiling a multi-thread program, the compiler obtains the may-happen-in-parallel regions of the program. The compiler obtains information on the utilization of the component 502 in a plurality of threads of a may-happen-in-parallel region, arranges a predicted-power-on instruction in each thread prior to the utilization of the component 502, and arranges a predicted-power-off instruction in each thread after the utilization of the component 502. When executing the predicted-power-on instruction, the power-gating controller 504 determines the state of the predicted register 510. When the predicted register 510 is in the power-gating controllable state, the switch 508 is activated and the power-gating controller 504 sets the power-gating control register 506 to a power-on state (conducting the power switch 512) and then sets the predicted register 506 to a power-gating non-controllable state indicating that the power-switch 512 has been activated. When executing the predicted-power-off instruction, the power-gating controller 504 determines whether the component 502 is required later in the may-happen-in-parallel region. When the component 502 is not required later, the power-gating controller 504 sets the predicted register 510 to the power-gating controllable state to activate the switch 508 and then sets the power-gating control register 506 to a power-off state to deactivate the power switch 512.

Figure 6:
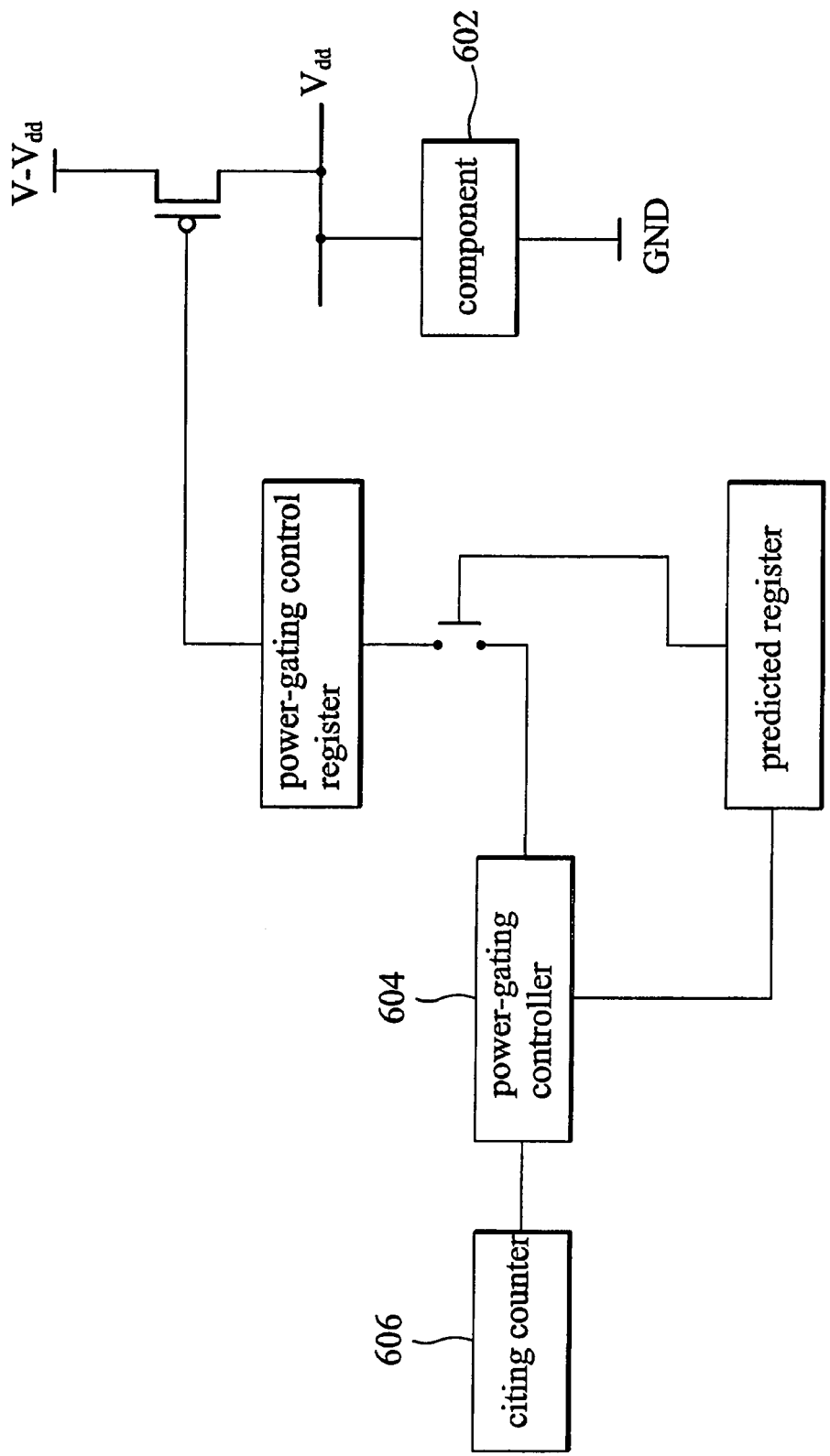
FIG. 6 shows another embodiment of the power-gating control mechanism of the invention that comprises a single power-gating controllable component.

FIG. 6 shows another embodiment of the power-gating control mechanism of the invention. Compared with FIG. 5, FIG. 6 further comprises a citing counter 606 having an initial value of zero. The value of the citing counter 606 indicates that the amount of executing threads requiring the component 602 later in the may-happen-in-parallel region. Compared to the power-gating controller 504, when executing the predicted-power-on instruction, the power-gating controller 604 further adds one to the citing counter 606 to indicate that one more executing thread requires the component 602 later. Compared to the power-gating controller 504, when executing the predicted-power-off instruction, the power-gating controller 606 further subtracts one from the citing counter 606 (to indicate that the executing thread does not require the component 602 later) and determines the value of the citing counter 606. When the citing counter 606 is zero, it means that the executing threads all finished the use of the component 602 and the component 602 can be set to a sleep mode.

Figure 7:
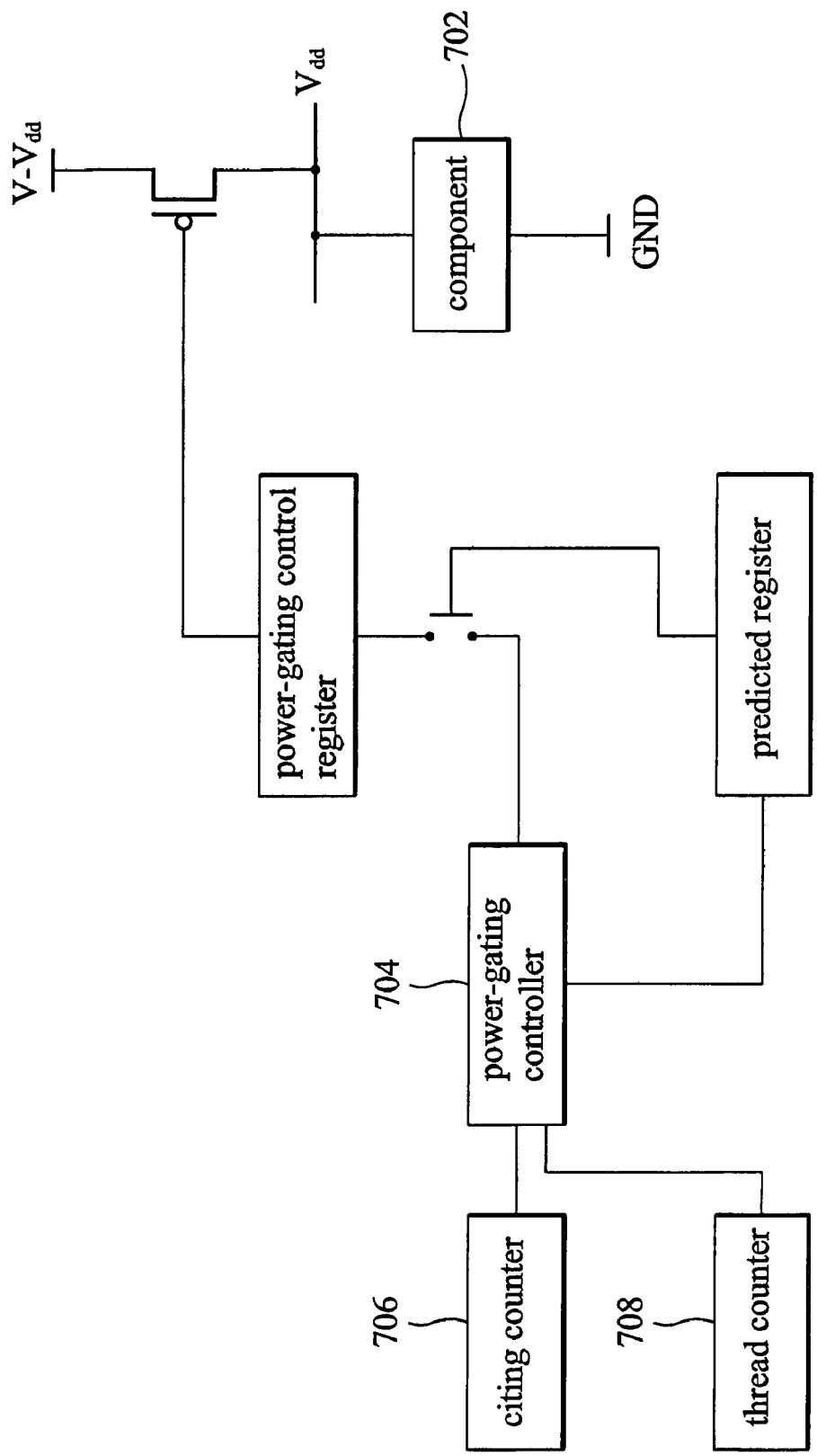
FIG. 7 shows yet another embodiment of the power-gating control mechanism of the invention that comprises a single power-gating controllable component.

FIG. 7 shows yet another embodiment of the power-gating control mechanism of the invention. Compared to FIG. 5, FIG. 7 further comprises a citing counter 706 and a thread counter 708. The initial value of the citing counter is zero and the thread counter has an initial value equal to the total amount of the threads of the may-happen-in-parallel region. The value of the citing counter 706 indicates the amount of executing threads that still require the component 702 later in the may-happen-in-parallel region. The value of the thread counter 708 indicates the amount of thread that has not begun to be executed. Compared to the power-gating controller 504, when executing the predicted-power-on instruction, the power-gating controller 704 further adds one to the citing counter 706 and subtracts one from the thread counter 708. Compared to the power-gating controller 504, when executing the predicted-power-off instruction, the power-gating controller 704 further subtracts one from the citing counter 706 and then determines the values of the citing counter 706 and the thread counter 708. When the values of the citing counter 706 and the thread counter 708 are both zero, it means that the utilization of the component 702 is finished in the may-happen-in-parallel region and the component 702 can be set to the sleep mode.

Figure 8:
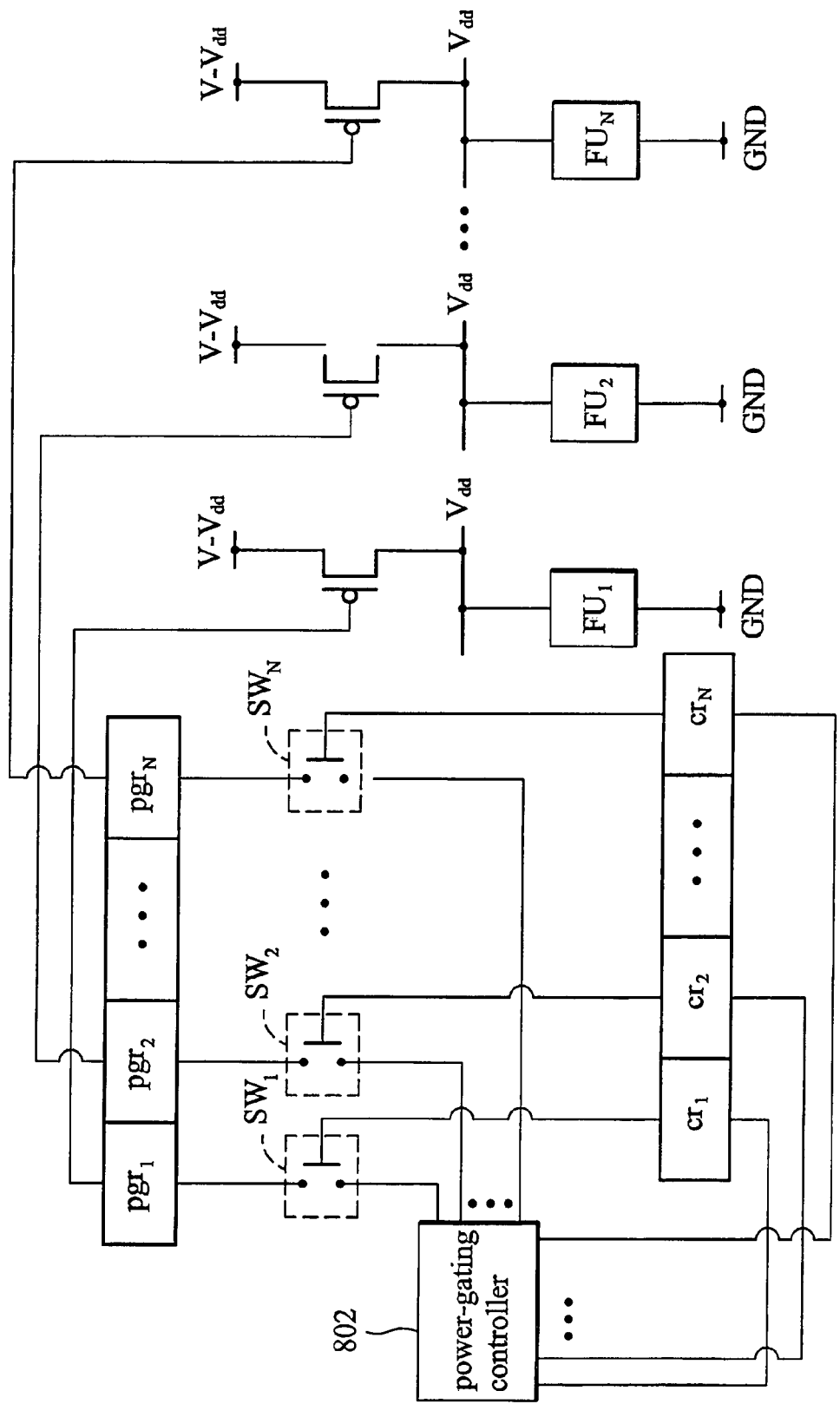
FIG. 8 shows an embodiment of the power-gating control mechanism of the invention that comprises a plurality of power-gating controllable components.

In some embodiments, the power-gating control mechanism of the invention comprises a plurality of components. FIG. 8 shows an embodiment of the power-gating control mechanism comprising a plurality of power-gating controllable components $FU_1 \sim FU_N$. The components $FU_1 \sim FU_N$ each corresponds to a power switch controlling the power state of the corresponding component. Referring to FIG. 8, the power-gating control mechanism comprises the components $FU_1 \sim FU_N$, a plurality of power-gating control registers $prg_1 \sim prg_N$, a plurality of switches $SW_1 \sim SW_N$, and a plurality of predicted registers $cr_1 \sim cr_N$. Similar to the power-gating controller 504 shown in FIG. 5, the power-gating controller 802 controls the value of the predicted registers $cr_1 \sim cr_N$ according to the predicted-power-on/power-off instructions, wherein the predicted registers $cr_1 \sim cr_N$ control the states of the switches $SW_1 \sim SW_N$.

Figure 9:
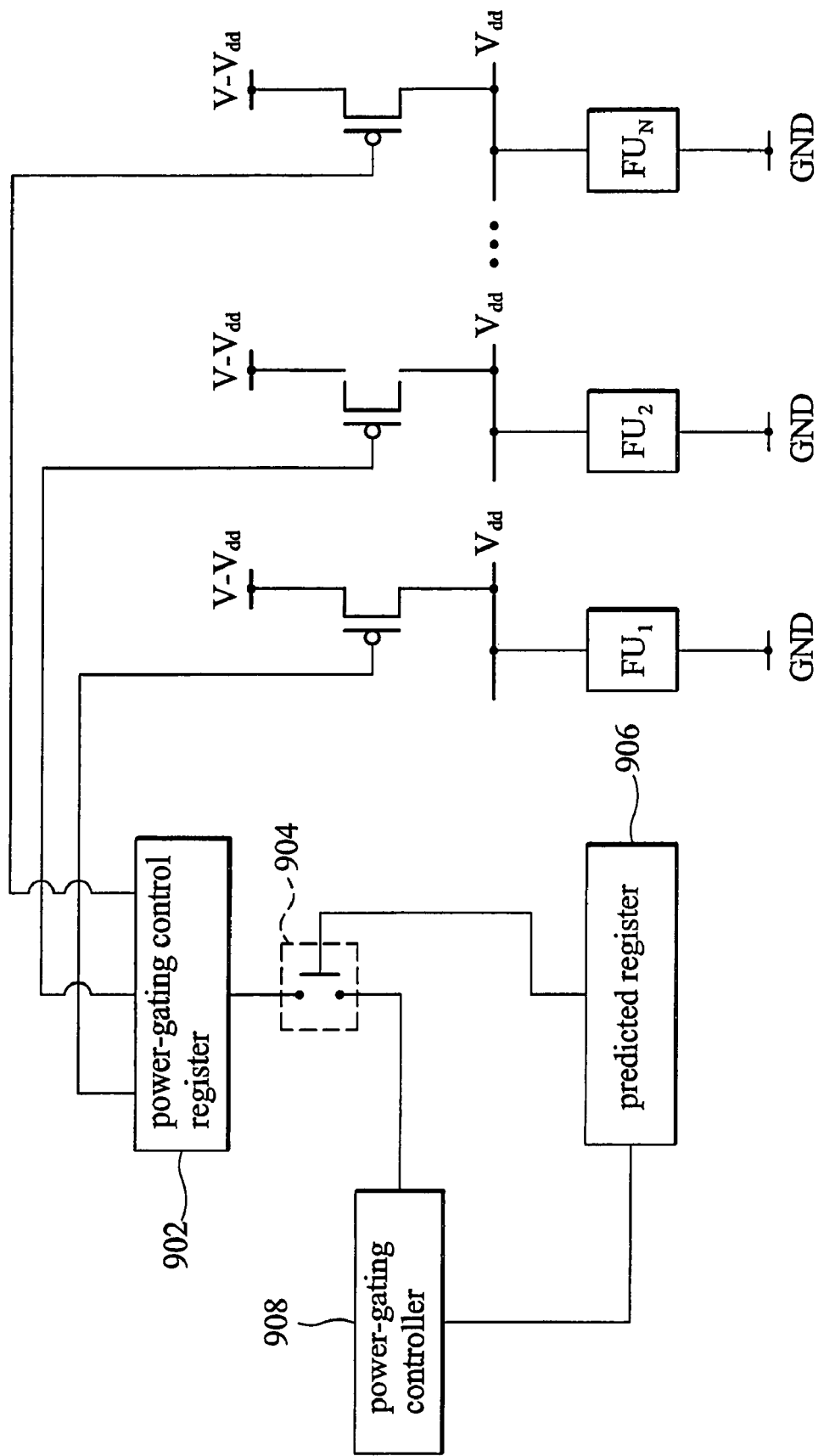
FIG. 9 shows another embodiment of the power-gating control mechanism of the invention that comprises a plurality of power-gating controllable components.

The amount of the power-gating control registers, switches and predicted registers increase with the increasing number of power-gating controllable components, thus occupying larger areas and may waste more energy. FIG. 9 shows another embodiment of the power-gating control mechanism of the invention. Referring to FIG. 9, the power-gating control registers $prg_1 \sim prg_N$, the switches $SW_1 \sim SW_N$ and the predicted registers $cr_1 \sim cr_N$ shown in FIG. 8 are replaced by a single power-gating control register 902, a single switch 904 and a single predicted register 906, respectively. The power switches of all components $FU_1 \sim FU_N$ are uniformly controlled by the power-gating control register 902. The switch 904 is coupled between the power-gating controller 908 and the power-gating control register 902, and activated or deactivated according to the state of the predicted register 906. The initial state of the predicted register 906 is a power-gating controllable state, which activates the switch 904.

The power-gating control mechanism further comprises a compiler (not shown in FIG. 9), which obtains information on the utilization of the components $FU_1 \sim FU_N$ in a plurality of threads of a may-happen-in-parallel region, arranges a predicted-power-on instruction for each component in each thread, and arranges a predicted-power-off instruction for each component in each thread. In each thread, each predicted-power-on instruction is arranged prior to the utilization of the corresponding component, and each predicted-power-off instruction is arranged after the utilization of the corresponding component. After arranging the predicted-power-gating instructions, the compiler determines whether the predicted-power-gating instructions in one thread are mergeable. When the power-gating control instructions are mergeable, the compiler provides a grouped predicted-power-on instruction into the thread to replace the predicted-power-on instructions in the thread, and provides a grouped predicted-power-off instruction in the thread to replace the predicted-power-off instructions in the thread.

When executing the grouped predicted-power-on instruction, the power-gating controller 908 determines the state of the predicted register 906. When the predicted register 906 is in the power-gating controllable state which means that the components $FU_1 \sim FU_N$ have not been powered on yet, the switch 904 is activated and the power-gating controller 908 sets the power-gating control register 902 to a power-on state to power on all components $FU_1 \sim FU_N$ at the same time. After powering on the components $FU_1 \sim FU_N$, the power-gating controller 908 sets the predicted register 906 to a power-gating non-controllable state to indicate that all components $FU_1 \sim FU_N$ have already been powered on.

When executing the grouped predicted-power-off instruction, the power-gating controller 908 determines whether the components $FU_1 \sim FU_N$ are required later in the may-happen-in-parallel region. When the utilization of the components $FU_1 \sim FU_N$ are finished in the may-happen-in-parallel region, the components $FU_1 \sim FU_N$ can be set to a sleep mode. The power-gating controller 908 sets the predicted register 906 to the power-gating controllable state to activate the switch 904 and then sets the power-gating control register 902 to a power-off state to deactivate the power switches of all components $FU_1 \sim FU_N$.

Figure 10:
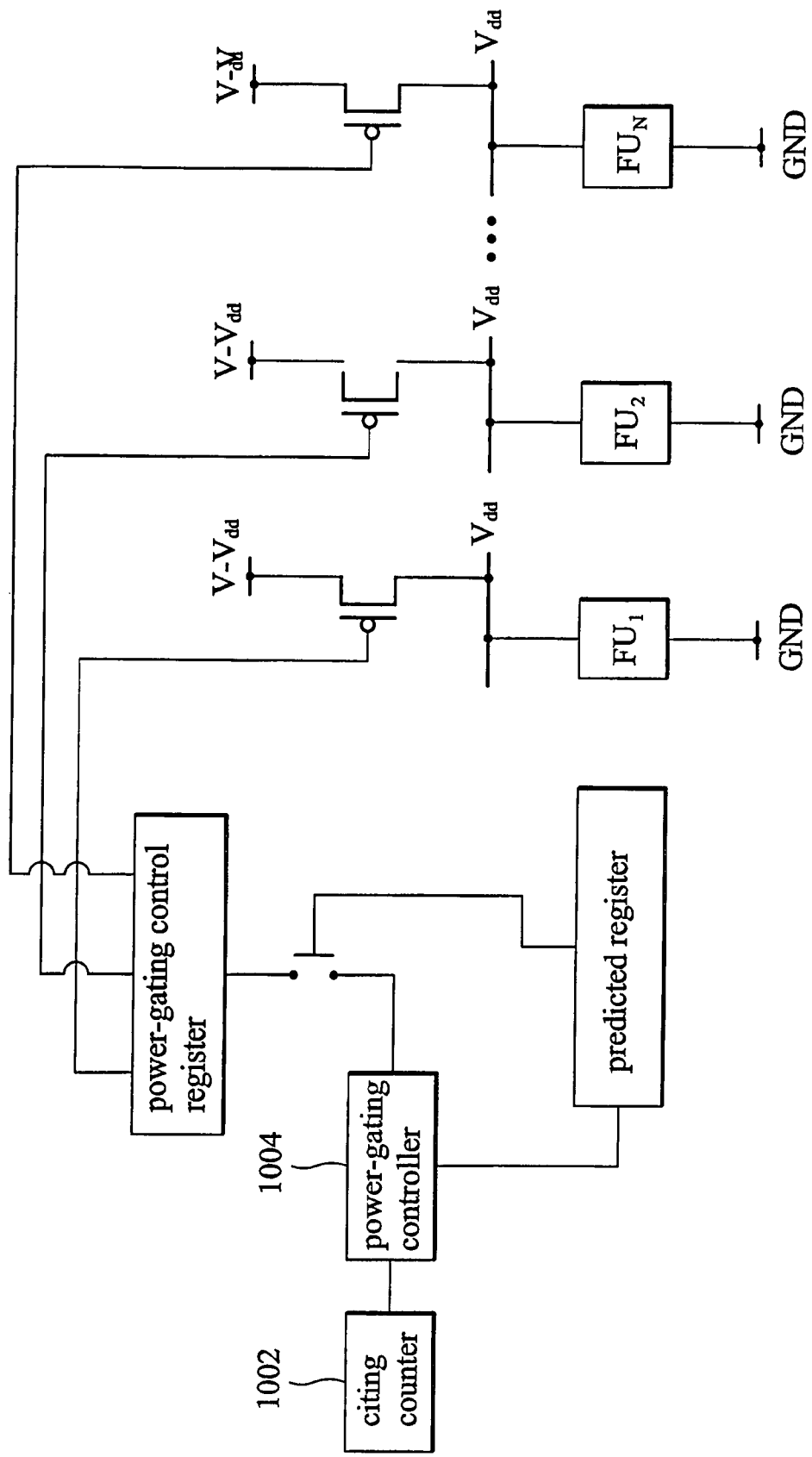
FIG. 10 shows yet another embodiment of the power-gating control mechanism of the invention that comprises a plurality of power-gating controllable components.

FIG. 10 shows yet another embodiment of the power-gating control mechanism comprising a plurality of power-gating controllable components. Compared to FIG. 9, FIG. 10 further comprises a citing counter 1002 having an initial value of zero. Compared to the power-gating controller 908 shown in FIG. 9, the power-gating controller 1004 further adds one to the citing counter 1002 when executing the grouped predicted-power-on instruction, to indicate the amount of executing threads that still require any of the components $FU_1 \sim FU_N$ later. Compared to power-gating controller 908, when executing the grouped predicted-power-off instruction, the power-gating controller 1004 further subtracts one from the citing counter 1002 and then determines the value of the citing counter 1002. When the citing counter 1002 is zero, it means that the executing threads all finished the use of the components $FU_1 \sim FU_N$ and all the components $FU_1 \sim FU_N$ can be set to the sleep mode.

While the invention has been described by way of example and in terms of embodiments, it is to be understood that the invention is not limited thereto. To the contrary, it is intended to cover various modifications and similar arrangements (as would be apparent to those skilled in the Art). Therefore, the scope of the appended claims should be accorded to the broadest interpretation so as to encompass all such modifications and similar arrangements.

What is claimed is:

1. A power-gating control method, comprising:
obtaining information on a utilization of a component in a plurality of threads of a may-happen-in-parallel region;
arranging a predicted-power-on instruction in each thread prior to the utilization of the component; and
arranging a predicted-power-off instruction in each thread after the utilization of the component;
wherein the predicted-power-on instructions each determine whether the component has already been powered on, and power on the component when the component has not been powered on yet;
wherein the predicted-power-off instructions each determine whether the component is required later in the may-happen-in-parallel region, and powers off the component when the component is not required later in the may-happen-in-parallel region.

2. The power-gating control method as claimed in claim 1, further comprising:
providing a predicted register, having an initial state of a power-gating controllable state; and
providing a citing counter, having an initial value of zero.

3. The power-gating control method as claimed in claim 2, wherein the behavior of the predicted-power-on instruction comprises:
determining the state of the predicted register and, when the predicted register is in the power-gating controllable state, powering on the component and setting the predicted register to a power-gating non-controllable state; and
adding one to the citing counter.

4. The power-gating control method as claimed in claim 3, wherein the behavior of the predicted-power-off instruction comprises:
subtracting one from the citing counter;
determining the value of the citing counter and, when the citing counter is zero, setting the predicted register to the power-gating controllable state; and
determining the state of the predicted register and, when the predicted register is in the power-gating controllable state, powering off the component.

5. The power-gating control method as claimed in claim 2, further comprising providing a thread counter having an initial value equal to the total amount of the threads.

6. The power-gating control method as claimed in claim 5, wherein the behavior of the predicted-power-on instruction comprises:
determining the predicted register and, when the predicted register is in the power-gating controllable state, powering on the component and setting the predicted register to a power-gating non-controllable state;
adding one to the citing counter; and
subtracting one from the thread counter.

7. The power-gating control method as claimed in claim 6, wherein the behavior of the predicted-power-off instruction comprises:
subtracting one from the citing counter;
determining the value of the citing counter and the thread counter and, when both the values of the citing counter and the thread counter are zero, setting the predicted register to the power-gating controllable state; and
determining the state of the predicted register and, when the predicted register is in the power-gating controllable state, powering off the component.

8. The power-gating control method as claimed in claim 1, further comprising determining whether the power-gating control method is more power-saving than a common power-gating control method that arranges a power-on instruction at the start of the may-happen-in-parallel region and a power-off instruction at the end of the may-happen-in-parallel region and, when the power-gating control method is more power-saving than the common power-gating control method, adopting the power-gating control method.

9. The power-gating control method as claimed in claim 8, further comprising a decision regarding the power-gating control method as being more power-saving than the common power-gating control method when an inequality is satisfied, wherein the inequality is $$(\overline{M}(C)+\underline{M}(C))\times(P_{leak}(C)-P_{rleak}(C))>K\times(E_{pseudo\_on}(C)+E_{pseudo\_off}(C)),$$

where
C represents the component,
$\overline{M}(C)=\min_{\forall i}\overline{\delta}(i,C)$, in which i represents the thread number, and $\overline{\delta}(i,C)$ indicates a time difference between the start of the ith thread and the time point the ith thread starts using the component C,
$\underline{M}(C)=\min_{\forall i}\underline{\delta}(i,C)$, in which $\underline{\delta}(i,C)$ represents the time difference between the time point the ith thread finishes using the component C and the end of the ith thread,
$P_{leak}(C)$ represents the power consumption due to current leakage when the component C is active,
$P_{rleak}(C)$ represents the power consumption due to current leakage when the component C is inactive,
K represents the total amount of the threads,
$E_{pseudo\_on}(C)$ represents energy dissipation while executing the predicted-power-on instruction without powering on the component C, and
$E_{pseudo\_off}(C)$ represents energy dissipation while executing the predicted-power-off instruction without powering off the component C.

10. A power-gating control method, comprising:
obtaining information on a utilization of a plurality of components in a plurality of threads of a may-happen-in-parallel region;
arranging a predicted-power-on instruction for each component in each thread prior to the utilization of the corresponding component;
arranging a predicted-power-off instruction for each component in each thread after the utilization of the corresponding component; and
determining whether the predicted-power-on instructions in one thread are mergeable and whether the predicted-power-off instructions in the thread are mergeable and, when the predicted-power-on instructions in the thread are mergeable and the predicted-power-off instructions in the thread are mergeable, providing a grouped predicted-power-on instruction to replace the predicted-power-on instructions in the thread and a grouped predicted-power-off instruction to replace the predicted-power-off instructions in the thread;
wherein the grouped predicted-power-on instruction determines whether the components have been powered on and, when the components have not been powered on yet, powers on all the components together;
wherein the grouped predicted-power-off instruction determines whether the components are required later in the may-happen-in-parallel region and, when the components are not required later in the may-happen-in-parallel region, powers off all the components together.

11. The power-gating control method as claimed in claim 10, further comprising:
provinding a predicted register, having an initial state of a power-gating controllable state; and
providing a citing counter, having an initial value of zero.

12. The power-gating control method as claimed in claim 11, wherein the behavior of the grouped predicted-power-on instruction comprises:
determining the state of the predicted register and, when the predicted register is in the power-gating controllable state, powering on all the components together and setting the predicted register to a power-gating non-controllable state; and
adding one to the citing counter.

13. The power-gating control method as claimed in claim 12, wherein the behavior of the grouped predicted-power-off instruction comprises:
subtracting one from the citing counter;
determining the value of the citing counter and, when the citing counter is zero, setting the predicted register to the power-gating controllable state; and
determining the state of the predicted register and, when the predicted register is in the power-gating controllable state, powering off all the components together.

14. The power-gating method as claimed in claim 10, further comprising a decision regarding the predicted-power-on instructions in one thread as mergeable and the predicted-power-off instructions in the thread as mergeable when an inequality is satisfied, wherein the inequality is $$\sum_{\forall C}[(\overline{M}(C)-\overline{M}+\underline{M}(C)-\underline{M})\times(\overline{P}_{leak}(C)-P_{rleak}(C))] < -K\times(E_{pseudo\_on}+E_{pseudo\_off})+\sum_{\forall C}K_C\times(E_{pseudo\_on}(C)+E_{pseudo\_off}(C)),$$

where
C represents one of the components,
$\overline{M}(C)=\min_{\forall i}\overline{\delta}(i,C)$, in which i represents the thread number, $\overline{\delta}(i,C)$ indicates the time difference between the start of the ith thread and the time point the ith thread starts using the component C;
$\underline{M}(C)=\min_{\forall i}\underline{\delta}(i,C)$, in which $\underline{\delta}(i,C)$ represents the time difference between the time point the ith thread finishes using the component C and the end of the ith thread,
$\overline{M}=\min_{\forall C}\overline{M}(C)$,
$\underline{M}=\min_{\forall C}\underline{M}(C)$,
$\overline{P}_{leak}(C)$ represents the power consumption due to current leakage when the component C is active,
$P_{rleak}(C)$ represents the power consumption due to current leakage when the component C is inactive,
K represents the total amount of the threads,
$E_{pseudo\_on}$ represents energy dissipation while executing the grouped predicted-power-on instruction without powering on the components,
$E_{pseudo\_off}$ represents energy dissipation while executing the grouped predicted-power-off instruction without powering off the components,
$K_C$ represents the total amount of the threads relating to the component C,
$E_{pseudo\_on}(C)$ represents energy dissipation while executing the predicted-power-on instruction without powering on the component C, and
$E_{pseudo\_off}(C)$ indicates energy dissipation while executing the predicted-power-off instruction without powering off the component C.

15. A power-gating control mechanism, comprising:
a component, comprising a power switch controlling the power of the component;
a compiler, obtaining information on a utilization of the component in a plurality of threads of a may-happen-in-parallel region, arranging a predicted-power-on instruction in each thread prior to the utilization of the component, and arranging a predicted-power-off instruction in each thread after the utilization of the component;
a power-gating controller;
a power-gating control register, controlled by the power-gating controller to determine the state of the power switch;
a switch, coupled between the power-gating controller and the power-gating control register; and
a predicted register, controlling the switch, and having an initial state of a power-gating controllable state that activates the switch;
wherein the power-gating controller determines the state of the predicted register when the predicted-power-on instruction is executed and, when the predicted register is in the power-gating controllable state, sets the power-gating control register to a power-on state and sets the predicted register to a power-gating non-controllable state;
wherein the power-gating controller determines whether the component is required later in the may-happen-in-parallel region when the predicted-power-off instruction is executed and, when the component is not required later, sets the predicted register to a power-gating controllable state and sets the power-gating controllable register to a power-off state.

16. The power-gating control mechanism as claimed in claim 15, further comprising a citing counter having an initial value of zero.

17. The power-gating control mechanism as claimed in claim 16, wherein the power-gating controller adds one to the citing counter when the predicted-power-on instruction is executed.

18. The power-gating control mechanism as claimed in claim 17, wherein the power-gating controller further executes the following steps when the predicted-power-off instruction is executed, and the steps comprises:
subtracting one from the citing counter; and
determining the value of the citing counter and, when the citing counter is zero, recognizing the component as not to be required later in the thread.

19. The power-gating control mechanism as claimed in claim 16, further comprising a thread counter having an initial value equal to the total amount of the threads.

20. The power-gating control mechanism as claimed in claim 19, wherein the power-gating controller further adds one to the citing counter and subtracts one from the thread counter when the predicted-power-on instruction is executed.

21. The power-gating control mechanism as claimed in claim 20, wherein the power-gating controller further executes the following steps when the conditional-power-off instruction is executed, and the steps comprises:
subtracting one from the citing counter; and
determining the value of the citing counter and the thread counter and, when both the citing counter and the thread counter are zero, recognizing the component as not to be required later in the thread.

22. A power-gating control mechanism, comprising:
a plurality of components, each comprising a power switch;

a compiler, obtaining information on a utilization of the components in a plurality of threads in a may-happen-in-parallel region, arranging a predicted-power-on instruction for each component in each thread prior to the utilization of the corresponding component, arranging a predicted-power-off instruction for each component in each thread after the utilization of the corresponding component, determining whether the predicted-power-on instructions in one thread are mergeable and whether the predicted-power-off instructions in the thread are mergeable and, when the predicted-power-on instructions in the thread are mergeable and the predicted-power-off instructions in the thread are mergeable, providing a grouped predicted-power-on instruction to replace the predicted-power-on instructions in the thread and a grouped predicted-power-off instruction to replace the predicted-power-off instructions in the thread;

a power-gating controller;

a power-gating control register, controlled by the power-gating controller to determine the states of the power switches of the components;

a switch, coupled between the power-gating controller and the power-gating control register; and a predicted register, controlling the switch and having an initial state of a power-gating controllable state that activates the switch;

wherein the power-gating controller recognizes the state of the predicted register when the grouped predicted-power-on instruction is executed and, when the predicted register is in the power-gating controllable state, sets the power-gating control register to a power-on state and sets the predicted register to a power-gating non-controllable state;

wherein the power-gating controller determines whether the components are required later in the may-happen-in-parallel region when the grouped predicted-power-off instruction is executed and, when the components are not required in the may-happen-in-parallel region, sets the predicted register to the power-gating controllable state and sets the power-gating control register to a power-off state.

23. The power-gating control mechanism as claimed in claim 22, further comprising a citing register having an initial value of zero.

24. The power-gating control mechanism as claimed in claim 23, wherein the power-gating controller further adds one to the citing counter when the grouped predicted-power-on instruction is executed.

25. The power-gating control mechanism as claimed in claim 24, wherein the power-gating controller further executes the following steps when the grouped predicted-power-off instruction is executed, and the steps comprises:

subtracting one from the citing counter; and determining the value of the citing counter and, when the citing counter is zero, recognizing the components as not to be required later in the may-happen-in-parallel region.

* * * * *